Figure 1:
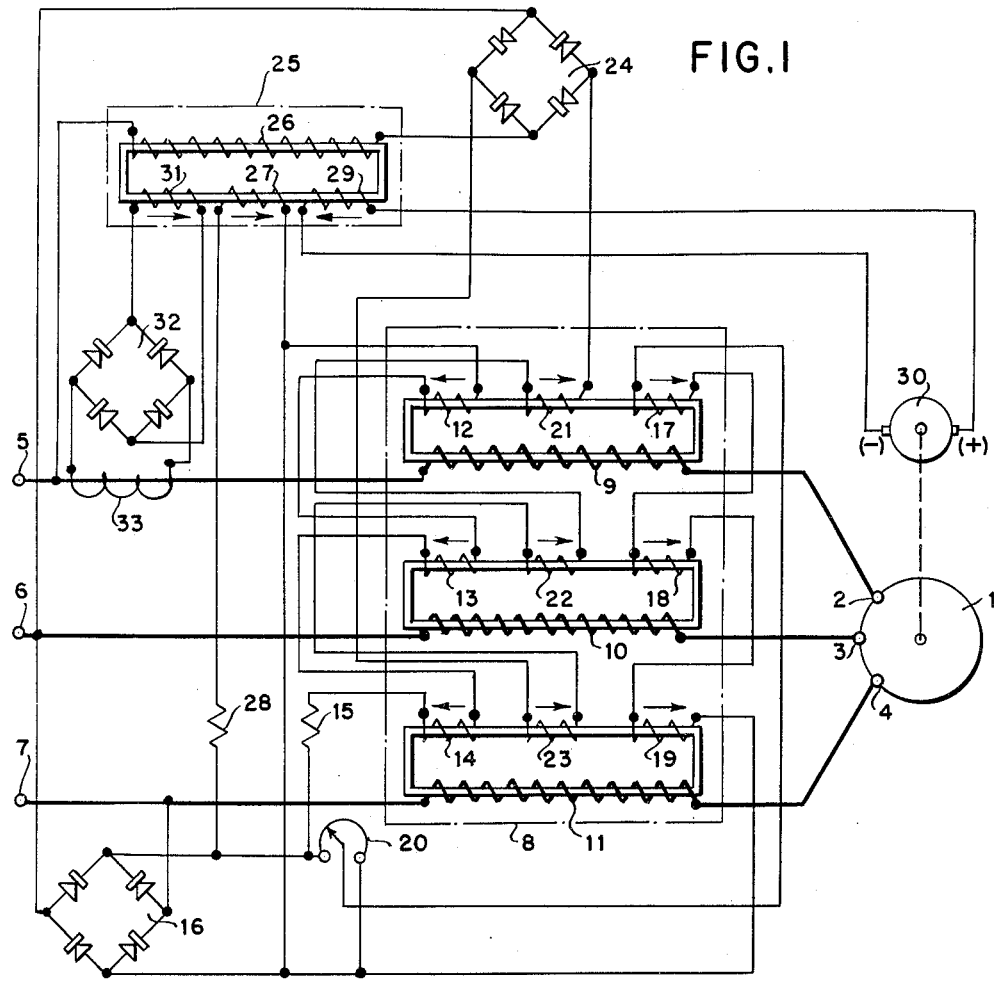

Sept. 27, 1955   H. R. BEHR ET AL   2,719,255
ALTERNATING CURRENT MOTOR CONTROL SYSTEMS
FOR PRINTING PRESSES OR THE LIKE
Filed Oct. 6, 1951   5 Sheets-Sheet 1

INVENTORS
HERBERT R. BEHR &
EARL C. RHYNE

BY *[signature]*

ATTORNEY

INVENTORS
HERBERT R. BEHR &
EARL C. RHYNE

Sept. 27, 1955 H. R. BEHR ET AL 2,719,255
ALTERNATING CURRENT MOTOR CONTROL SYSTEMS
FOR PRINTING PRESSES OR THE LIKE
Filed Oct. 6, 1951 5 Sheets-Sheet 5

INVENTORS
HERBERT R. BEHR &
EARL C. RHYNE

BY

ATTORNEY

United States Patent Office 2,719,255
Patented Sept. 27, 1955

2,719,255

ALTERNATING CURRENT MOTOR CONTROL SYSTEMS FOR PRINTING PRESSES OR THE LIKE

Herbert R. Behr and Earl C. Rhyne, Western Springs, Ill., assignors to Cline Electric Manufacturing Company, Chicago, Ill., a corporation of Illinois Application October 6, 1951, Serial No. 250,082

29 Claims. (Cl. 318—229)

Our invention relates generally to alternating-current motor control systems and, in one of its particular aspects, to control systems for induction motors in drives for printing presses or like machinery.

It is an object of our invention to provide a motor control system capable of operating an induction motor, such as a squirrel cage motor or wound-rotor motor, at a stable and accurately controllable speed within a stepless range of subsynchronous speed values and with the aid of control equipment of reliable performance and economically satisfactory cost, maintenance and space requirements. The significance of this general object and its various specific aspects will be realized from the following.

To satisfy the demand for utilizing the advantages of induction motors in printing press drives and other machinery of similar operating requirements, it has been necessary to supplement the normally operating large drive motor with a smaller additional motor to provide starting and inching torque and to get the press partially up to speed.

If it were economically possible to eliminate the additional motor drive and to perform all slow-speed operations as well as the rated-speed or normal operations with only one induction motor, the avoidance of the gearing needed for the additional motor and the resulting overall simplification and space reduction would offer greatly desirable advantages. However, considerably more torque is developed in the required large induction motors than is utilized in the operations usually performed by the additional small motor so that, when providing a single motor, special means are needed to reduce the torque of the large motor to that of a small motor. These special means, involving a voltage-balanced or unbalanced control of the energization of the induction motor, have heretofore been far from satisfactory.

According to one of the known proposals, electronic discharge tubes are disposed in the power circuit of the motor in conjunction with various electronic accessories, and the condition-responsive regulatory intelligence is supplied exclusively from a tachometer generator. This proposal leaves much to be desired especially when applied to printing press drives, because the speed and torque conditions of the printing presses during normal performance are so considerably different from the conditions during threading, inching and other slow-speed operations that the desired characteristics over a wide range of slow-speed stability require such a large amount of intricate and fault-susceptible electronic accessories as to outweigh the advantages expected of the elimination of the additional motor.

It is therefore a more specific object of our invention to devise an induction motor control system, suitable for printing press drives and similar job requirements, that affords a reliable and stable speed control over a wide speed range and down to speed values close to zero and that secures this performance with the aid of simpler and smaller control means than heretofore needed, especially as regards the means for providing the speed-responsive intelligence inclusive of any appertaining amplifying devices.

Another object of our invention, relating to induction motor control systems of the above-mentioned kind, is to permit giving the speed-torque characteristic of the motor, within the controllable subsynchronous speed range, a load-independent constancy of speed to an extent not attained, or attained only with difficulty, when using exclusively speed-responsive control intelligence.

According to our invention, we provide the alternating-current energizing circuit of an induction motor with series impedances or other means for controlling the motor terminal voltage, and we connect the control means with one or more sources of variable intelligence voltage responsive to an electric condition of the motor circuit and also with a source of variable intelligence voltage responsive to the motor speed, so that the electrically responsive and the speed responsive voltages are jointly effective to control the motor terminal voltage, usually in coaction with a normally constant—though, if desired, adjustable—bias or pattern voltage.

According to another and more specific feature of the invention, the alternating-current supply circuit of the induction motor is equipped with saturable reactor means with one or more direct-current saturation control coils which receive a constant and preferably adjustable excitation from a source of pattern or bias voltage and also a variable excitation controlled by at least two other sources of which one responds to an electric load-dependent condition of the motor while the other is a tachometer generator or other speed-responsive voltage supply, the control effect of the constant or pattern excitation being opposed to the resultant control effect of the variable control excitation.

According to still another feature of the invention, a saturable main reactor, series connected in the motor energizing circuit, has, aside from its constant-voltage pattern or bias winding means, only one control coil for variable control voltages, and this one variable-voltage coil is excited from a rectifier series connected with a saturable transfer reactor, which transfer reactor operates as a mixer and has as many direct-current control circuits as are needed to mix the speed-responsive intelligence voltage with one or more intelligence voltages responsive to motor load current, motor terminal voltage or other electric load-dependent conditions of motor operation.

It will be recognized that in motor control systems according to the invention, the speed-responsive intelligence is only one component of a totality of control stimuli of which a considerable or even major portion is directly, i. e. electrically, derived from the motor power supply itself and hence readily available and applicable with the aid of static and relatively simple circuit devices. Hence the energy demands on the speed-responsive voltage source are correspondingly reduced. Indeed this source may be designed only for providing an additive or corrective stimulus needed to stabilize the electric-resultant control effect, especially at the lower speeds. The joint control by speed-responsive intelligence and resultant electric-responsive intelligence also offers the possibility of adapting the subsynchronous speed-torque characteristic of the motor to an optimum configuration by correspondingly proportioning the various intelligence voltages relative to one another.

Figure 2:
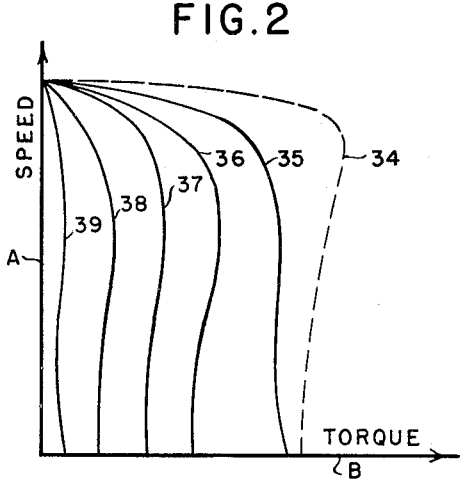
Figure 3:
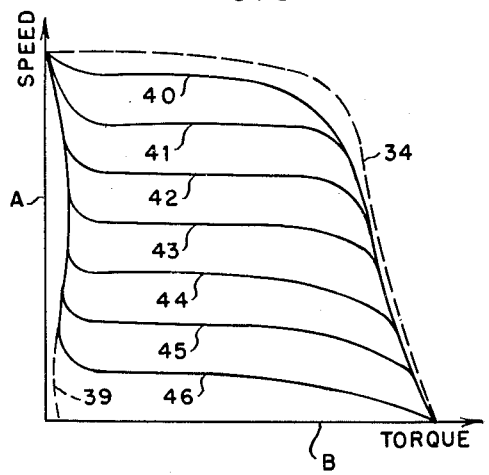

The foregoing and other objects and features of the invention will be apparent, and the above-mentioned performance and advantages will be more fully understood from the following description of the embodiments of control systems according to the invention shown by way of example on the drawings in which Figs. 1, 4, 5, 6 and 7 show schematically the circuit diagrams of five different systems respectively, while Figs. 2 and 3 are explanatory speed-torque diagrams elucidating the operation of such systems.

In the system of Fig. 1, a three-phase induction motor 1 has its field terminals 2, 3, 4 connected with respective line terminals 5, 6, 7. It is inessential and hence not shown whether the motor field windings are star or delta connected and whether the motor is of the squirrel-cage or wound-rotor type. The alternating-current supply circuit between motor terminals and line terminals is equipped with voltage control means consisting of variable inductance device 8 with three saturable reactors, one for each phase of the circuit.

The main inductance windings 9, 10, and 11 of the reactors are series connected between motor terminals 2, 3 and 4 and line terminals 5, 6 and 7. The magnetic core means of the device may have any of the various known designs or may be composed of core combinations generally applicable for saturable reactors and providing a closed path for a premagnetizing field which is controlled by three sets of premagnetizing control windings 12—13—14, 17—18—19, and 21—22—23. Each of these sets of control windings, as illustrated, comprises three series connected windings, one for each phase, although it should be understood that each set may consist of any single winding or combination of windings, provided the set, when energized, gives identical premagnetizing fields in each of the three phases and prevents or minimizes transformer action between control and main inductance windings. The pre-magnetizing windings 12, 13 and 14 are connected to a direct-current source 16 of constant voltage in order to provide a premagnetizing bias field of constant magnitude.

A calibrating or stabilizing resistor 15 may be series connected with windings 12, 13, 14, if needed. The direct current source 16 is shown as a single-phase full-wave rectifier bridge connected across line terminals 6 and 7, although any other type of direct-current source of steady voltage may be used. The circuit of control windings 17, 18 and 19 is connected to the direct current source 16 through a selectively adjustable potentiometer rheostat 20 which permits setting the premagnetizing current from a very low or zero value up to a magnitude at which the reactor core is saturated. The rheostat 20 may, of course, be replaced by any other device which, when properly operated, permits adjusting the premagnetizing current in the wanted manner.

The control windings 21, 22, 23 are connected to a direct current source 24, here shown as a single-phase full-wave rectifier bridge energized from line terminals 5 and 6 in series with a saturable single-phase transfer reactor 25. The transfer reactor 25 carries three premagnetizing control coils 27, 29, 31. Coil 27 receives constant bias voltage from the direct-current source 16. A calibrating or stabilizing series resistor 28 may be provided if needed. Coil 29 is connected to a pilot or tachometer generator 30 mechanically coupled to the motor 1 so that its output voltage is proportional to the speed of the motor.

The tachometer generator, here shown as a direct-current machine, may consist of an alternator in combination with a rectifier or it may be replaced by any other suitable circuit device of speed proportional output voltage, such as, a rectifier circuit connected to the secondary terminals of a wound-rotor motor and having an output voltage proportional to the slip frequency.

The control coil 31 is connected through a rectifier bridge 32 to a current transformer 33 which is inserted between line terminal 5 and motor terminal 2. The current-sensitive control circuit of rectifier 32 and current transformer 33 may of course be replaced by any other device or circuit giving a direct-current output voltage of a magnitude varying in accordance with the motor load current.

In the main reactor 8, the constant bias voltage applied to control windings 12, 13, 14 determines only the operating point or range of the magnetic reactor characteristic, the magnitude and polarity of the bias voltage being dependent upon design and material of the magnetizable reactor core. Under certain conditions the bias winding 12, 13, 14 could possibly be omitted by electrically dimensioning the pattern control circuit of windings 17, 18, 19 so that it has also the function of applying the desired constant bias.

It will thus be evident that normally the main reactor 8 is subjected to a component constant premagnetization, furnished by the bias and pattern excitation whose magnitude is adjusted by means of rheostat 20 in accordance with a desired operating condition in particular the speed of the motor. This adjusted constant component of premagnetization is opposed by the component of premagnetication controlled by the intelligence-excitation applied to windings 21, 22, 23 from rectifier 24 under control by the variable reactance of the transfer reactor winding 26. Consequently, the main reactor, during the operation of the motor, is controlled to adjust the reactance of its main windings 9, 10, 11, and hence the motor energization, so that the adjusted constant pattern excitation is approximately balanced by the variable excitation.

Although this variable excitation is the resultant of a plurality of variable conditions (speed and load-dependent circuit conditions), each of these variables is ultimately dependent upon the drive load imposed upon the motor. Hence when the motor is operating under steady-state conditions and at the reduced terminal voltage due to the voltage drop of the main reactor winding, the speed-torque characteristic of the motor has a shape and a load-responsive behavior determined by the magnitudes and proportions of the speed-responsive and other condition-responsive intelligence voltages.

Depending upon the desired motor characteristic, the speed-responsive and other variable intelligence voltages may be additive or subtractive as regards their respective premagnetization of the transfer reactor, but one of them should be predominant so that the other has substantially a corrective function. For instance, for minimizing the means for providing the speed-responsive intelligence voltage, the magnitude of this particular intelligence is kept smaller than that of the other. The motor is then predominantly controlled by intelligence voltage derived from the electric motor circuit, while the speed-responsive voltage provides merely a recalibrating or corrective control with the result of greatly extending the controllable speed range, especially toward the lower speed values where a merely electro-responsive control would be unstable.

This performance is illustrated by the comparative schematic characteristics shown in Figs. 2 and 3.

If in an induction motor control system with series impedances, such as the illustrated saturable reactors, the series impedance is of a fixed magnitude, for instance, if in the system of Fig. 1 the premagnetization of the main reactor 8 is kept constant by disconnecting the variable voltage windings 21, 22, 23 or applying constant excitation thereto, then the speed-torque characteristic will have a configuration as typified by the family of curves 34 to 39 shown in Fig. 2 in which A indicates the speed axis and B the torque axis. For the zero value of the series inductance of reactor 8, the system has, for instance, a speed-torque characteristic similar to curve 34 in Fig. 2 which is the normal full voltage characteristic of the motor 1.

When the inductance is increased, which is done by decreasing the pattern voltage of rheostat 20 in Fig. 1, the speed torque characteristic changes accordingly so that, for greater and greater values of the inductance, the corresponding speed-torque characteristic will be closer and closer to the speed axis A in Fig. 2. As these characteristics show, some speed control can be obtained by a manually variable series inductance, but such a control permits the motor speed to vary considerably with the motor load. It will now be understood that if the inductance value, besides being manually controlled, is automatically varied in such a way that it decreases for an increase in motor load and increases for a decrease in load, and if this decrease or increase is adjusted properly to the motor and the inductance device, then the speed-torque characteristics of the system can be greatly modified, for instance, to provide a family of curves of the type shown at 40 to 46 in Fig. 3 in which A and B likewise indicate the speed and torque axes, respectively. In the system according to Fig. 1, such an automatic variation is obtained by the automatic control of the current flowing from the rectifier bridge 24 through the reactor control windings 21, 22 and 23, this current being a function of the motor current and its speed, which in turn are both functions of the motor load condition as explained previously.

It should be understood that, instead of mixing only two signals, one obtained from the rectifier bridge 32 and one from the pilot generator 30, and thus taking one resulting signal from the rectifier bridge 24, any number of additional signals may be impressed on the mixing or transfer reactor 25, thereby varying the resulting signal obtained from rectifier 24. It is also possible to eliminate the transfer reactor and to supply the signals directly to one or more premagnetizing windings on the core of the main reactor 8, provided the resulting premagnetizing field in the core of the main reactor is the proper resultant of an adjusted constant voltage and one or more variable control voltages dependent, respectively, upon the speed and at least one load-dependent electric condition of the motor.

Figure 4:
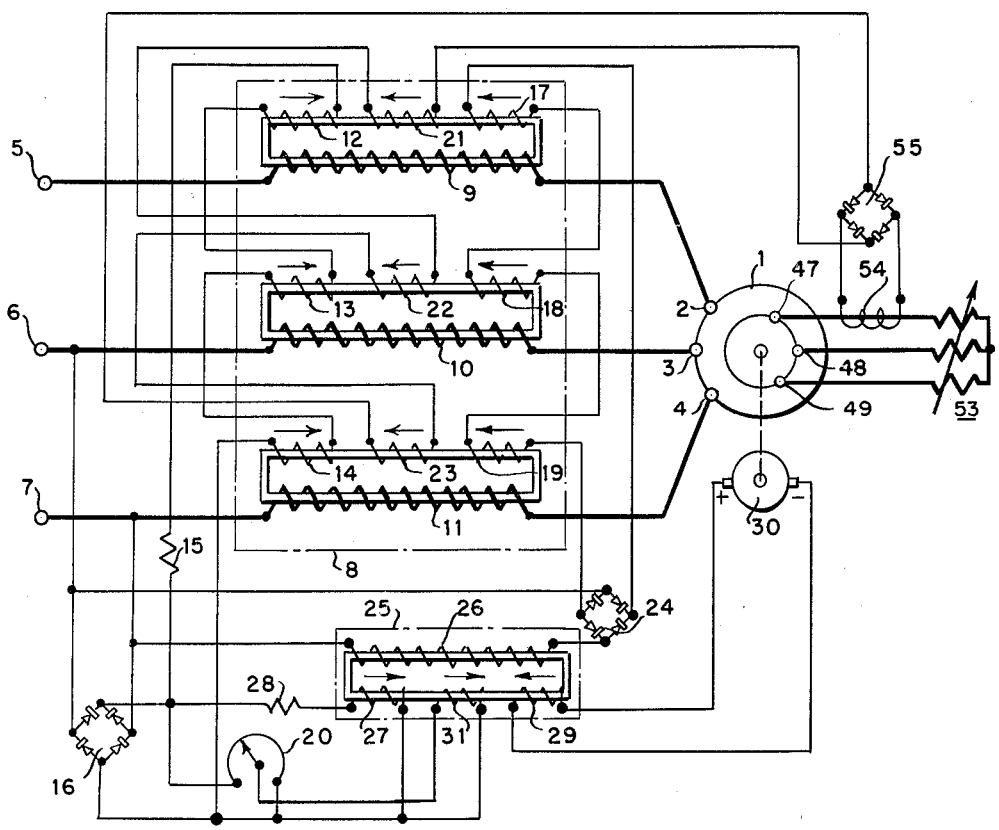

The motor control system according to Fig. 4 has a motor 1 of the wound-rotor type with three secondary terminals 47, 48, 49 connected to the respective resistors of a secondary resistor unit 53. A current transformer 54 is interposed between one secondary motor terminal 47 and the corresponding resistor. Transformer 54 energizes a rectifier bridge 55 in accordance with the current in the secondary motor circuit. The primary current supply circuit of the motor is connected in the same manner as shown in Fig. 1, the appertaining main reactor 8 being also in accordance with Fig. 1. The premagnetizing windings 17, 18, 19 and 21, 22, 23 of the main reactor 8 according to Fig. 4, however, are connected in a different manner. Windings 21, 22, 23 are connected to the rectifier bridge 55, and windings 17, 18, 19 are connected to the rectifier bridge 24 whose energization is controlled by the transfer reactor 25.

The control coil 27 of transfer reactor 25 is connected to the direct-current source 16 through a resistor 28 as in Fig. 1; but coil 31 of the transfer reactor is connected to the pattern-voltage rheostat 20, and coil 29 is connected to the tachometer generator, 30. The motor secondary current and the motor speed are both functions of the motor drive load. Consequently the premagnetization in the main reactor and the transfer reactor is ultimately dependent upon the motor loading so that the system, properly adjusted, has a performance which is similar to that described in conjunction with Fig. 1 and permits obtaining speed-torque characteristics of the type shown in Fig. 3.

Figure 5:
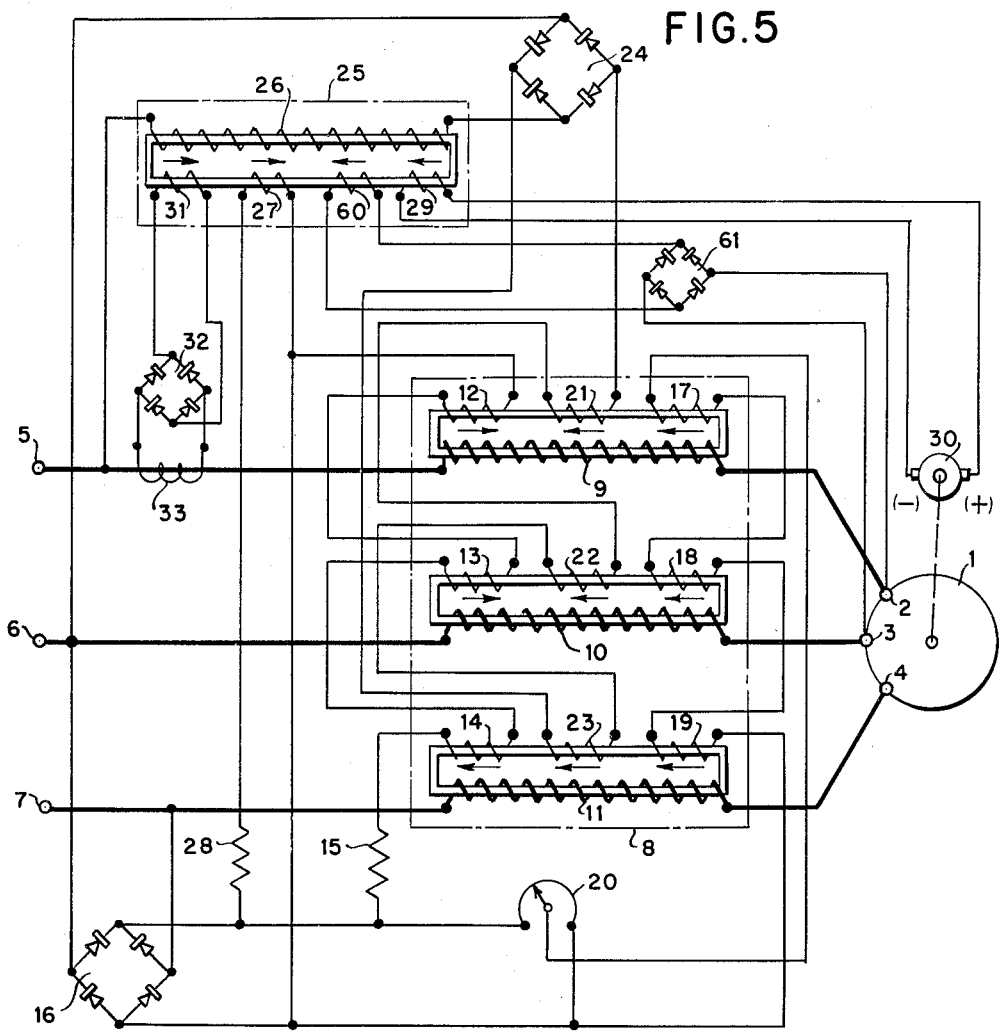

The system according to Fig. 5 differs from that of Fig. 1 in utilizing the motor terminal voltage as a component control intelligence for controlling the main saturable reactor 8. To this end, the transfer reactor 25 is equipped with a premagnetizing coil 60 in addition to the control coils previously described with reference to Fig. 1. The additional coil 60 is connected to the output terminals of a rectifier 61 whose input circuit is connected across the motor terminals 2 and 3. If necessary, a resistor or rheostat (not shown) may be inserted between motor terminals and coil 60 for voltage adjusting or current limiting purposes. The rectified voltage impressed on coil 60 is a function of load and acts conjointly with the current-responsive control voltage from current transformer 33 and the speed-responsive voltage from tachometer generator 30 to produce a performance substantially as described previously.

While in the illustrated embodiments described so far a current-responsive control circuit is used for providing part or all of the control intelligence responsive to an electric circuit condition of the motor, it will be understood that an exclusively voltage-responsive control circuit can be used instead. For instance, in a system otherwise designed as shown in Fig. 5 the current transformer 33, rectifier 32 and control coil 31 may be omitted so that the only variable control voltage coacting with the speed-responsive control voltage is the one derived through rectifier 61 from across the motor terminals. However, the voltage responsive circuit may also be connected across any other suitable portion of the motor energizing circuit, provided this circuit portion has a voltage drop variable in dependence upon load conditions or upon the impedance variation of the main reactor. This will be recognized from the embodiment shown in Fig. 6 which also exemplifies the provision of an electrodynamic amplifier instead of the transfer reactors described in the foregoing.

Figure 6:
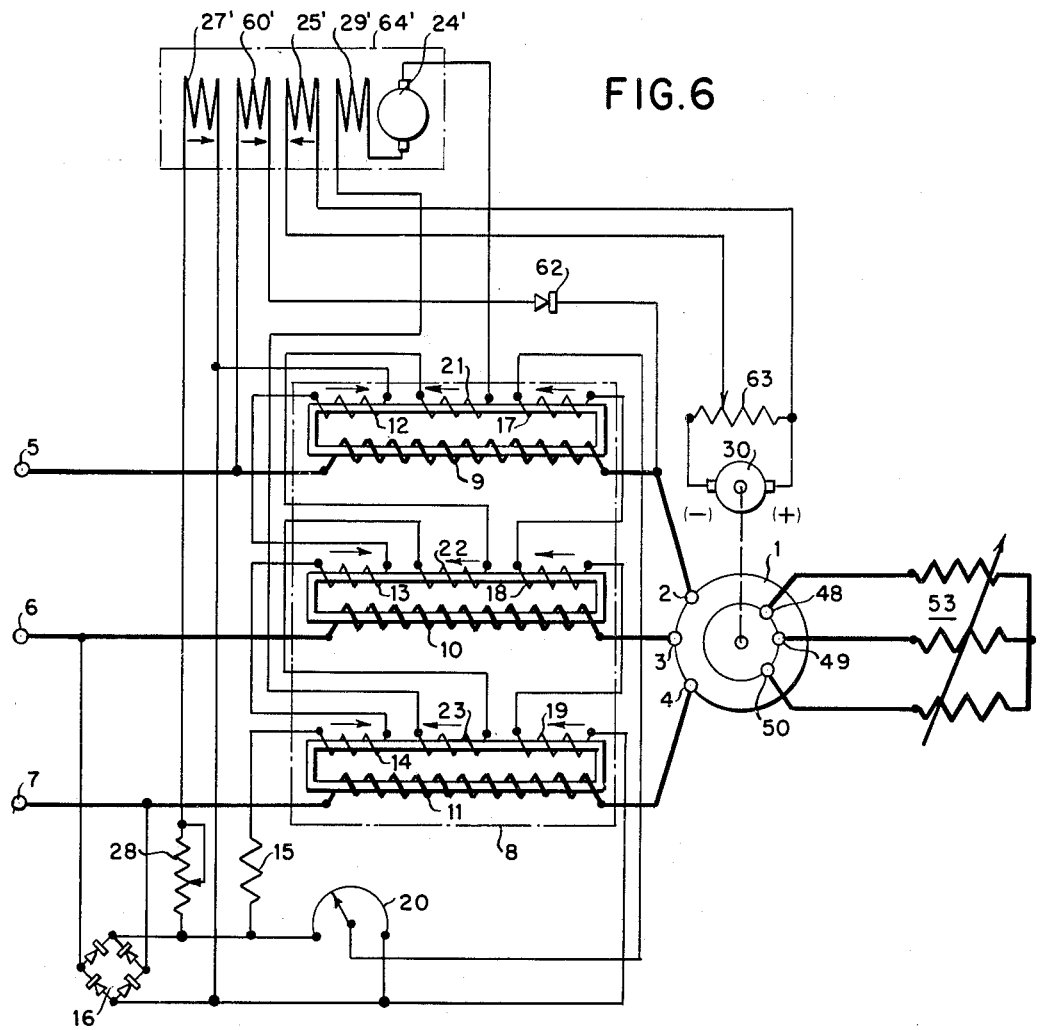

In the system according to Fig. 6, the primary terminals 2, 3, 4 of a wound-rotor motor are connected to respective line terminals 5, 6, 7 through a three-phase reactor set 8 with main windings 9, 10, 11 and control coils 12 to 14, 17 to 19 and 21 to 23, substantially as in the embodiments previously described. The control coils 12 to 14 and 17 to 19 have their circuits designed and energized in the same manner as those of the above-described embodiments of Fig. 1. However, the amplifying and mixing device for energizing the coils 21 to 23 in the system of Fig. 6 consists essentially of an amplifying generator 25' whose armature impresses controllable direct voltage upon the reactor control coils 21, 22, 23 under control by three field windings 27', 29' and 60'. The particular generator exemplified in Fig. 6 is also equipped with a self-excited series field winding 64' whose resistance line is approximately coincident with the unsaturated and substantially linear portion of the no-load saturation characteristic of the generator. During the operation of the system, the armature 24' is driven at constant speed, and the amplifier output voltage is proportional to the resultant field of the control coils 27', 29', 60'.

The amplifier control coil 27' receives adjusted constant excitation through resistor 28 from rectifier 16, and the control coil 29' is energized by speed-proportional voltage from a rheostat 63 connected to the tachometer generator 30. The resultant field of coils 29' and 60' is opposed to that of coil 27'. It will be recognized that the circuit connections of coils 27' and 29' are similar to those of the respective amplifier control coils 27 and 29 of the preceding embodiments. However, aside from the provision of an electrodynamic amplifier, the system of Fig. 6 differs from the embodiments previously described in having none of its amplifier control coils energized from a current transformer. Instead, the control coil 60' of the amplifier is connected through a rectifier 62 across the alternating-current winding 9 in one phase of the main reactor 8. While a half wave rectifier 62 is shown, it will be understood that other rectifier designs are applicable and that auxiliary resistance means may be connected in the circuit. Control coil 60' thus receives a rectified voltage whose magnitude depends upon the voltage drop across the reactor in the motor energizing circuit. This voltage drop is variable with varying motor load conditions so that the systems can be given a performance as described above.

The speed of the motor is adjusted at rheostats 20 and 28 and may be set to any desired value within the available range, for instance, by changing the setting of either rheostat, leaving the other rheostat fixed. It is also possible to omit the reactor control coils 17, 18, 19 and the pertaining D.-C. energizing circuit with rheostat 20. The rheostat 28 then serves as the only speed-setting member of the system.

Figure 7:
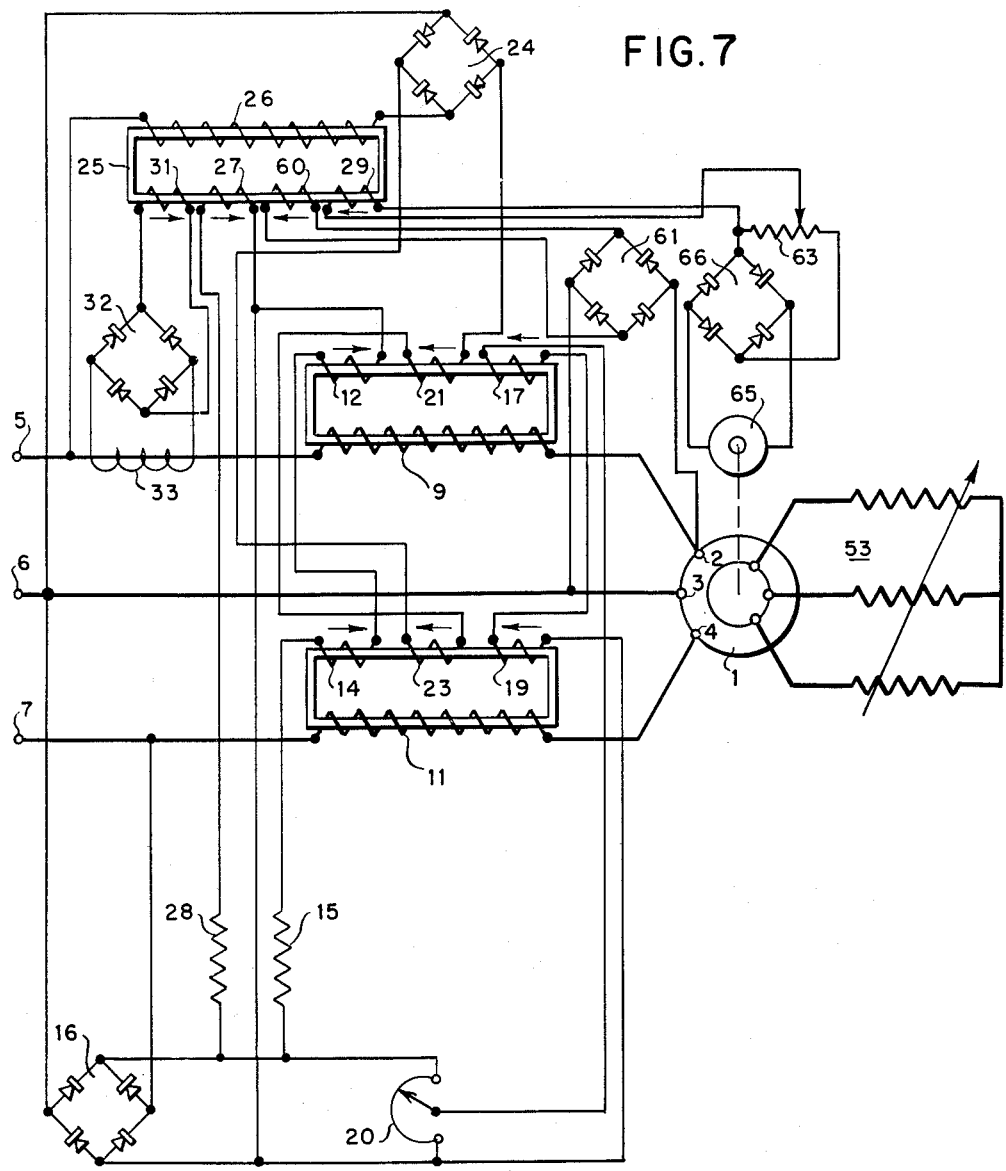

The motor control system according to Fig. 7 is largely similar to those previously described but differs therefrom by having the saturable reactors for controlling the motor terminal voltage inserted in only two phases of the three-phase primary circuit. This system is equipped with a wound-rotor motor whose secondary circuit has an adjustable resistance unit 53. The speed-responsive component control voltage is supplied from an alternating-current tachometer generator 65 in combination with a rectifier 66 which impresses its speed-proportional output voltage across a potentiometer rheostat 63 of normally fixed adjustment.

The control windings 12, 17, 21 on the core of reactor main winding 9, and the control windings 14, 19, 23 on the core of reactor main winding 11 are excited in the same manner as the corresponding windings in the systems of Figs. 1 and 5. The control coils 27, 29, 31 and 61 are energized by circuit connections corresponding to those of Fig. 5, with the exception of the above-mentioned modification of the speed-responsive source of component control voltage. As regards the stabilizing and correcting effect of the three condition-responsive voltages impressed upon coils 29, 31 and 60 of the amplifying transfer reactor 25, the performance of the system of Fig. 7 is similar to that of the other embodiments.

While the illustrated embodiments of the invention are equipped with saturable-core reactors for controlling terminal voltage and energy supplied to the motor, and although we consider such reactor controls preferable for printing press drives, it will be apparent that other stepless voltage control means, such as transformer means classed as controllable impedances, could be used for embodying the above-disclosed principles of the invention in certain adaptations thereof.

Furthermore, while we prefer using in printing press drives a normally adjustable pattern voltage for setting the terminal voltage control means of the motor energizing circuit in accordance with a desired speed or speed-torque characteristic, other known devices for setting such a pattern condition are also applicable. For instance, a constant premagnetization of the saturable reactors can be obtained by means of permanent magnets, or the variable intelligence voltages can be made to furnish an adjustable component of pattern excitation by passing them through a rheostat-adjustable non-linear bridge network of the type known and in use for generator voltage regulators.

It will be obvious to those skilled in the art, that other modifications are available without departure from the objects and essential features of our invention and within the scope of the claims annexed hereto.

We claim:

1. A motor control system, comprising a multiphase, alternating current induction motor, a multiphase alternating-current supply circuit having voltage control means connected in series between the source of current supply and said motor and including a control device in each of a plurality of the phases of said supply circuit for impressing controllable energizing voltage on said motor, first variable-voltage supply means responsive to a load condition of said motor, second variable-voltage supply means having a tachometer generator providing an output voltage responsive to the motor speed, said first and said second voltage supply means being both connected with said control means to jointly control said energizing voltage.

2. A motor control system, comprising a multiphase, alternating-current induction motor having terminals, a multiphase alternating-current supply circuit connected to said terminals and having multiphase circuit control means in series between the source of current supply and said motor for varying the motor terminal voltage, including a control device in each of a plurality of the phases of said supply circuit, condition-responsive circuit means of variable output voltage attached to said circuit control means for componently controlling said terminal voltage and connected with said supply circuit to respond to a load-dependent condition of said motor, and speed-responsive voltage supply means including a tachometer generator connected with said motor and attached to said circuit control means for componently controlling said terminal voltage in dependence upon the motor speed.

3. A motor control system, comprising a multiphase, alternating-current induction motor, a multiphase alternating-current supply circuit connected to said motor, controllable impedance devices, one thereof being series connected in each of a plurality of the phases of said circuit, said impedance devices having voltage-responsive impedance control means, condition-responsive circuit means of variable output voltage connected to said control means for componently controlling the impedance of said devices, said circuit means being connected with said supply circuit and responsive to a load-dependent condition of said motor, and speed-responsive voltage supply means including a tachometer generator connected with said motor and attached to said control means for componently controlling said impedance in dependence upon the motor speed.

4. A motor control system, comprising a multiphase alternating-current induction motor, a multi-phase alternating-current supply circuit connected to said motor and having multi-phase voltage control means connected in series between the source of current supply and said motor for impressing variable terminal voltage of substantially balanced phase distribution on said motor, condition-responsive circuit means of variable output voltage electrically attached to said voltage control means and connected with said supply circuit for componently controlling said terminal voltage in response to an electric condition of said supply circuit, and speed-responsive voltage supply means including a tachometer generator connected with said motor and attached to said voltage control means for componently controlling said terminal voltage in dependence upon the motor speed.

5. A motor control system, comprising a multiphase, alternating-current induction motor, a multiphase alternating-current supply circuit connected to said motor, controllable impedance devices, one thereof being series connected in each of a plurality of the phases of said circuit, said impedance devices having voltage-responsive impedance control means, a direct-current source of adjustable constant voltage connected with said control means for componently controlling the impedance of said device, and condition-responsive circuit means having a variable output voltage and being connected with said control means for componently controlling said impedance, said circuit means being connected with said supply circuit and responsive to an electric operating condition controlled by said impedance device, and a source of substantially speed-proportional voltage including a tachometer generator connected with said motor and with said control means for componently controlling said impedance, said circuit means and said sources being poled relative to one another in the sense needed for stabilizing the performance of said motor.

6. A motor control system, comprising a multiphase, alternating-current induction motor, a multiphase alternating-current supply circuit connected with said motor to provide it with energizing voltage, saturable reactor means including a reactor series connected in each of a plurality of the phase of said supply circuit, said reactor means having reactance-controlling premagnetizing winding means, a first control circuit of variable voltage connected with said supply circuit and responsive to load-dependent condition of said motor, a second control circuit of variable voltage having speed-responsive voltage supply means including a tachometer generator connected with said motor, said first and said second control circuits being both connected with said winding means for jointly controlling said motor energizing voltage.

7. A motor control system, comprising a multiphase, alternating-current induction motor, a multiphase alternating-current supply circuit connected with said motor to provide it with energizing voltage, saturable reactor means including a reactor series connected in each of a plurality of the phases of said supply circuit, said reactor means having reactance-controlling direct-current winding means, a first control circuit having a variable unidirectional output voltage and being connected with said supply circuit and responsive to load-dependent condition of said motor, a second control circuit having a variable unidirectional output voltage and having speed-responsive voltage supply means including a tachometer generator connected with said motor, a third control circuit having an adjustable constant and unidirectional output voltage, said three control circuits being connected with said winding means of said reactor means for jointly controlling said motor energizing voltage by said output voltages.

8. A motor control system, comprising an induction motor, an alternating-current supply circuit connected with said motor to provide it with energizing voltage, saturable reactor means series connected in said supply circuit and having reactance-controlling direct-current coil means, a first control circuit having a rectifier inputwise connected with said supply circuit to provide rectified output voltage variable in response to an electric condition dependent upon the motor load, a second control circuit having a tachometer generator mechanically connected with said motor to provide output voltage variable in response to motor speed, and a third control circuit of constant voltage having voltage adjusting means for providing an output voltage of selective constant magnitude, said three control circuits being connected with said winding means for jointly controlling said energizing voltage.

9. A motor control system, comprising a multiphase, alternating-current induction motor, a multiphase alternating-current supply circuit having voltage control means connected in series between the source of current supply and said motor and including a control device in each of a plurality of the phases of said supply circuit for impressing controllable energizing voltage on said motor, a current responsive control circuit inputwise connected with said supply circuit and outputwise connected with said control means for componently controlling said energizing voltage in dependence upon the motor load current, a speed-responsive control circuit connected with said control means for componently controlling said energizing voltage, and adjustable voltage means also connected with said control means for presetting a desired load-speed characteristic.

10. A motor control system according to claim 8, comprising a current transformer connected in said supply circuit and having a secondary winding connected in said first control circuit at the input side of said rectifier so that said rectified output voltage varies in dependence upon the motor load current.

11. A motor control system, comprising a wound-rotor alternating-current induction motor having a primary circuit and a secondary circuit, said primary circuit having voltage control means connected in series between the source of current supply and said motor for varying the primary voltage of said motor, a first control circuit having a current transformer connected with said secondary motor circuit to provide a variable control voltage dependent upon the current in said secondary circuit, a second control circuit having speed-responsive means connected with said motor to provide another variable control voltage in dependence upon the motor speed, said first and second control circuits being connected with said voltage control means for jointly controlling said motor terminal voltage by said two variable control voltages.

12. A motor control system, comprising a multiphase, alternating-current induction motor, an alternating-current supply circuit connected to said motor, controllable impedance devices, one thereof being series connected in each of a plurality of the phases of said circuit, said impedance devices having voltage-responsive impedance control means, voltage supply means connected with said impedance control means and having a voltage-responsive control circuit and a speed-responsive control circuit, said voltage responsive control circuit componently controlling the impedance of said device in dependence upon the motor terminal voltage, and said speed-responsive control circuit having voltage supply means including a tachometer generator connected with said motor for componently controlling said impedance in dependence upon the motor speed.

13. A motor control system, comprising a multiphase, alternating-current induction motor having a multiphase alternating-current supply circuit, saturable reactance means including a reactor series connected in each of a plurality of the phases of said supply circuit, said saturable reactance means having direct-current control winding means for controlling the reactance thereof, a condition-responsive circuit means having a variable direct-current output voltage and being connected with said control winding means for controlling said reactance by said voltage, said circuit means being connected with said supply circuit and responsive to voltage controlled by said reactance means for varying said impedance in the sense needed to stabilize the performance of said motor, and a source of substantially speed-proportional voltage including a tachometer generator connected with said motor and with said reactance means for correctively varying said reactance.

14. A motor control system, comprising an induction motor, an alternating-current supply circuit connected with said motor, saturable main reactor means series connected in said supply circuit and having direct-current control means, a direct-current pattern circuit of adjustable constant voltage connected to said control means, a mixer having an alternating-current circuit and having a saturable transfer reactance device and a rectifier series connected in said latter circuit, said rectifier having an output circuit connected with said control means of said main reactance device in voltage opposed relation to said pattern circuit, said transfer reactance device having saturation controlling coil means, a first control circuit of variable voltage connected with said supply circuit and responsive to an electric load-dependent condition of said supply circuit, a second control circuit of variable voltage having speed-responsive voltage supply means connected with said motor, said first and said second control circuits being both connected with said coil means for jointly controlling said transfer reactance device.

15. In a motor control system according to claim 14, said coil means of said transfer reactance device comprising three coils, said first control circuit being connected with one of said coils, said second control circuit being connected with another one of said coils, and a direct-current circuit of constant bias voltage connected with the third coil.

16. A motor control system, comprising an induction motor, an alternating-current supply circuit connected with said motor, saturable main reactor means series connected in said supply circuit and having direct-current control means, a direct-current pattern circuit of adjustable constant voltage connected to said control means, a mixer having an alternating-current circuit and having a saturable transfer reactance device and a rectifier series connected in said latter circuit, said rectifier having an output circuit connected with said control means of said main reactance device in voltage opposed relation to said pattern circuit, said transfer reactance device having saturation controlling coil means, current-responsive control means having a voltage variable in dependence upon motor current and being connected with said coil means, voltage-responsive control means having a voltage variable in dependence upon motor voltage and being connected with said coil means, and speed-responsive control means connected with said coil means and having a voltage dependent upon motor speed, said speed-responsive control means being poled relative to its effect on said mixer in opposition to the resultant effect of said current responsive and voltage responsive control means.

17. In an electric motor control system, in combination, a multiphase alternating-current induction motor having a primary circuit and a secondary circuit, a multiphase alternating-current supply circuit connected to said primary circuit, a balanced multiphase controllable impedance device series connected in said primary circuit and having impedance control means, a direct-current source of adjustable constant voltage interconnected with said control means for componently controlling the impedance of said device, a tachometer generator coupled to the motor to have a voltage output, at its output terminals, proportional to the motor speed, and an amplifying generaor, said amplifying generator including an armature and field winding means for controlling the voltage of said armature, said field winding means being responsive to said direct-current source of adjustable constant voltage and to said voltage output of said tachometer generator and also being responsive to an electrical condition of one of said two first-mentioned circuits, said armature of said amplifying generator being connected with said impedance control means for componently controlling said impedance to control the speed of said motor.

18. A motor control system, comprising an induction motor, an alternating-current supply circuit connected with said motor to provide it with energizing voltage, saturable reactor means series connected in said supply circuit and having reactance-controlling direct-current winding means, a first control circuit having a variable unidirectional output voltage and being connected with said supply circuit and responsive to an electric load-dependent condition of said supply circuit, a second control circuit having a variable unidirectional output voltage and having speed-responsive voltage supply means including a tachometer generator connected with said motor, a third control circuit having an adjustable constant and unidirectional output voltage, said three control circuits being connected with said winding means of said reactor for jointly controlling said motor energizing voltage by said output voltages, said first control circuit being connected across said supply circuit at the motor side of said reactor means so that said variable voltage of said first control circuit is dependent upon the magnitude of said motor energizing voltage.

19. A motor control system, comprising an induction motor, an alternating-current supply circuit connected with said motor to provide it with energizing voltage, saturable reactor means series connected in said supply circuit and having reactance-controlling direct-current winding means, a first control circuit having a variable unidirectional output voltage and being connected with said supply circuit and responsive to an electric load-dependent condition of said supply circuit, a second control circuit having a variable unidirectional output voltage and having speed-responsive voltage supply means connected with said motor, a third control circuit having an adjustable constant and unidirectional output voltage, said three control circuits being connected with said winding means of said reactor for jointly controlling said motor energizing voltage by said output voltages, said first control circuit being connected across said reactor means so that said variable voltage of said first control circuit is dependent upon the voltage drop across said reactor means.

20. In an electric motor control system, in combination, a multiphase, alternating-current induction motor having a primary circuit and a secondary circuit, a multiphase, alternating-current supply circuit connected to said primary circuit, a balanced multiphase saturable reactance device series connected in said primary circuit and having control winding means, a direct-current source of adjustable constant voltage interconnected with said control winding means for componently controlling the impedance of said device, a tachometer generator coupled to the motor to have a voltage output, at its output terminals, proportional to the motor speed, an amplifying generator, said amplifying generator including an armature and field winding means for controlling the voltage of said armature, said field winding means being responsive to said direct-current source of adjustable constant voltage and to said voltage output of said tachometer generator and also being responsive to an electric condition of one of said two first-mentioned circuits, said armature of said amplifying generator being connected with said control winding means for componently controlling said impedance to control the speed of said motor.

21. A motor control system, comprising an induction motor, an alternating-current supply circuit connected with said motor to provide it with energizing voltage, saturable reactor means series connected in said supply circuit and having reactance-controlling coil means, a first control circuit having a rectifier inputwise connected with said supply circuit to provide rectified output voltage variable in response to an electric condition dependent upon the motor load, a second control circuit having a tachometer generator mechanically connected with said motor to provide output voltage variable in response to motor speed, and a third control circuit of constant voltage having voltage adjusting means for providing an output voltage of selective constant magnitude, said three control circuits being connected with said winding means for jointly controlling said energizing voltage.

22. A motor control system, comprising a multiphase, alternating current induction motor, a multiphase alternating-current supply circuit connected with said motor to provide it with energizing voltage, saturable reactor means including a reactor series connected in each of a plurality of the phases of said reactor means, said supply circuit having reactance-controlling direct-current winding means, a first control circuit having a variable unidirectional output voltage and being connected with said supply circuit and responsive to a load-dependent condition of said motor circuit, a second control circuit having a variable unidirectional output voltage and having speed-responsive voltage supply means connected with said motor, a third control circuit having an adjustable constant and unidirctional output voltage, said three control circuits being connected with said winding means of said reactor means for jointly controlling said motor energizing voltage by said output voltages, said supply circuit having a current-responsive circuit member connected therein in series relation to said motor to provide a voltage according to the motor load current, said circuit member forming part of said first control circuit.

23. A motor control system, comprising a multiphase alternating-current supply circuit having voltage control means connected in series between the source of current supply and said motor and including a control device in each of a plurality of the phases of said supply circuit for impressing controllable energizing voltage on said motor, first variable-voltage supply means responsive to a load current of the motor, second variable-voltage supply means responsive to the motor speed, said first and said second voltage supply means being both connected with said control means to jointly control said energizing voltage.

24. A motor control system, comprising a multiphase alternating-current supply circuit having voltage control means connected in series between the source of current supply and said motor and including a control device in each of a plurality of the phases of said supply circuit for impressing controllable energizing voltage on said motor, first variable-voltage supply means responsive to the voltage appearing across said voltage control means, second variable-voltage supply means responsive to the motor speed, said first and said second voltage supply means being both connected with said control means to jointly control said energizing voltage.

25. A motor control system, comprising a multiphase alternating-current supply circuit having voltage control means connected in series between the source of current supply and said motor and including a control device in each of a plurality of the phases of said supply circuit for impressing controllable energizing voltage on said motor, first variable-voltage supply means responsive to a rotor current of the motor, second variable-voltage supply means responsive to the motor speed, said first and said second voltage supply means being both connected with said control means to jointly control said energizing voltage.

26. A motor control system, comprising a multiphase alternating-current supply circuit having voltage control means connected in series between the source of current supply and said motor and including a control device in each of a plurality of the phases of said supply circuit for impressing controllable energizing voltage on said motor, first variable-voltage supply means responsive to the voltage appearing at the rotor terminals of the motor, second variable-voltage supply means responsive to the motor speed, said first and said second voltage supply means being both connected with said control means to jointly control said energizing voltage.

27. A motor control system, comprising a multiphase, alternating-current induction motor, a multiphase, alternating-current supply circuit having voltage control means connected in series between the source of current supply and said motor and including a control device in each of a plurality of the phases of said supply circuit for impressing controllable energizing voltage on said motor, a magnetic amplifying device, first variable voltage supply means responsive to a load condition of said motor, second variable supply means responsive to the motor speed, said first and said second voltage supply means being both connected with said magnetic amplifying device to control the output thereof, said output being connected with said control means to control said energizing voltage.

28. A motor control system, comprising a multiphase, alternating-current induction motor, a multiphase, alternating-current supply circuit having voltage control means connected in series between the source of current supply and said motor and including a control device in each of a plurality of the phases of said supply circuit for impressing controllable energizing voltage on said motor, a rotating amplifier, first variable voltage supply means responsive to a load condition of said motor, second variable voltage supply means responsive to the motor speed, said first and said second voltage supply means being both connected with said rotating amplifier to control the output thereof, said output being connected with said control means to control said energizing voltage.

29. A motor control system, comprising a multiphase, alternating-current induction motor, a multiphase, alternating-current supply circuit having voltage control means connected in series between the source of current supply and said motor and including a control device in each of a plurality of the phases of said supply circuit for impressing controllable energizing voltage on said motor, an amplifying device, first variable voltage supply means responsive to a load condition of said motor, second variable voltage supply means responsive to the motor speed, said first and said second voltage supply means being both connected with said amplifying device to control the output thereof, said output being connected with said control means to control said energizing voltage.

References Cited in the file of this patent

UNITED STATES PATENTS

| | | |
|---|---|---|
| 2,228,078 | Gulliken | Jan. 7, 1941 |
| 2,299,911 | Logan | Oct. 27, 1942 |
| 2,433,153 | Pell et al. | Dec. 23, 1947 |
| 2,455,869 | Krabbe | Dec. 7, 1948 |
| 2,462,751 | Koehler | Feb. 22, 1949 |
| 2,589,277 | Noodleman | Mar. 18, 1952 |

FOREIGN PATENTS

| | | |
|---|---|---|
| 353,893 | Great Britain | July 22, 1931 |